(12) United States Patent
Dharmaraj

(10) Patent No.: US 10,081,445 B2
(45) Date of Patent: Sep. 25, 2018

(54) ARTIFICIAL GRAVITY SYSTEM WITH A ROTATING STRUCTURE THAT ROTATES ABOUT A STATIONARY STRUCTURE

(71) Applicant: The Boeing Company, Chicago, IL (US)

(72) Inventor: Raju Dharmaraj, League City, TX (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 15/274,930

(22) Filed: Sep. 23, 2016

(65) Prior Publication Data
US 2017/0240303 A1 Aug. 24, 2017

Related U.S. Application Data

(63) Continuation-in-part of application No. 15/052,383, filed on Feb. 24, 2016.

(51) Int. Cl.
*B64G 1/60* (2006.01)
*B64G 1/12* (2006.01)
*B64G 1/46* (2006.01)

(52) U.S. Cl.
CPC ............ *B64G 1/60* (2013.01); *B64G 1/12* (2013.01); *B64G 1/46* (2013.01)

(58) Field of Classification Search
CPC .. F16D 67/02; B64G 1/12; B64G 1/46; B64G 1/60
See application file for complete search history.

(56) References Cited

U.S. PATENT DOCUMENTS

| | | | | |
|---|---|---|---|---|
| 3,744,739 A * | 7/1973 | Weaver | ............. | B64G 1/12 244/172.4 |
| 4,643,375 A * | 2/1987 | Allen | ............. | B64G 1/60 244/171.9 |
| 5,791,600 A * | 8/1998 | Thompson | ............. | B64G 1/12 244/120 |
| 6,206,328 B1 * | 3/2001 | Taylor | ............. | B64G 1/12 244/159.6 |
| 6,216,984 B1 * | 4/2001 | Brinsmade | ............. | B64G 1/12 244/159.4 |
| 6,523,782 B2 * | 2/2003 | Barutt | ............. | B64G 1/12 244/171.9 |
| 9,090,361 B2 * | 7/2015 | Clay | ............. | B64G 1/14 |
| 9,359,091 B2 * | 6/2016 | Biddlecom | ............. | B64G 1/46 |
| 9,776,743 B2 * | 10/2017 | Dharmaraj | ............. | B64G 1/46 |

(Continued)

*Primary Examiner* — Philip J Bonzell
*Assistant Examiner* — Michael B Kreiner
(74) *Attorney, Agent, or Firm* — Duft Bornsen & Fettig LLP

(57) ABSTRACT

A habitation module that provides an artificial gravity environment. In one embodiment, the habitation module includes a stationary structure and a rotating structure. The stationary structure includes circular side walls that are coaxially aligned and attached by one or more support beams. The rotating structure slides onto the stationary structure, and rotates about an axis in relation to the stationary structure. The rotating structure includes a cylindrical hub, and a plurality of gravity chambers that are permanently affixed to the cylindrical hub and project radially from the axis. Radial seals form an air-tight seal between the rotating structure and the stationary structure.

25 Claims, 20 Drawing Sheets

(56) References Cited

U.S. PATENT DOCUMENTS

| | | | |
|---|---|---|---|
| 2014/0068858 A1* | 3/2014 | Wambeke | A47G 9/062 5/420 |
| 2014/0124627 A1* | 5/2014 | Clay | B64G 1/14 244/159.3 |
| 2017/0197734 A1* | 7/2017 | Dharmaraj | B64G 1/12 |
| 2017/0197735 A1* | 7/2017 | Dharmaraj | B64G 1/46 |
| 2017/0197736 A1* | 7/2017 | Dharmaraj | B64G 1/60 |
| 2017/0197738 A1* | 7/2017 | Dharmaraj | B64G 1/60 |
| 2017/0240302 A1* | 8/2017 | Dharmaraj | B64G 1/60 |
| 2017/0240303 A1* | 8/2017 | Dharmaraj | B64G 1/60 |

* cited by examiner

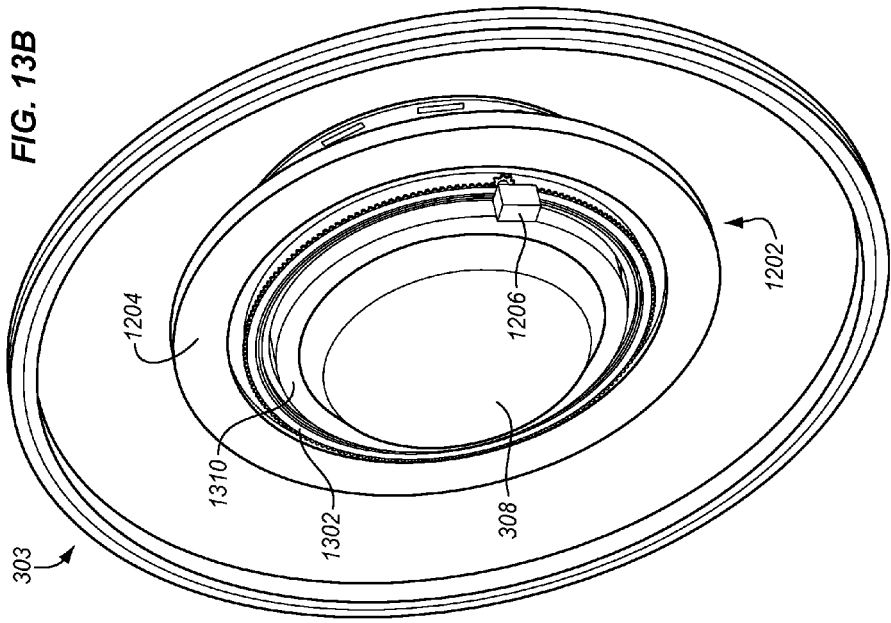
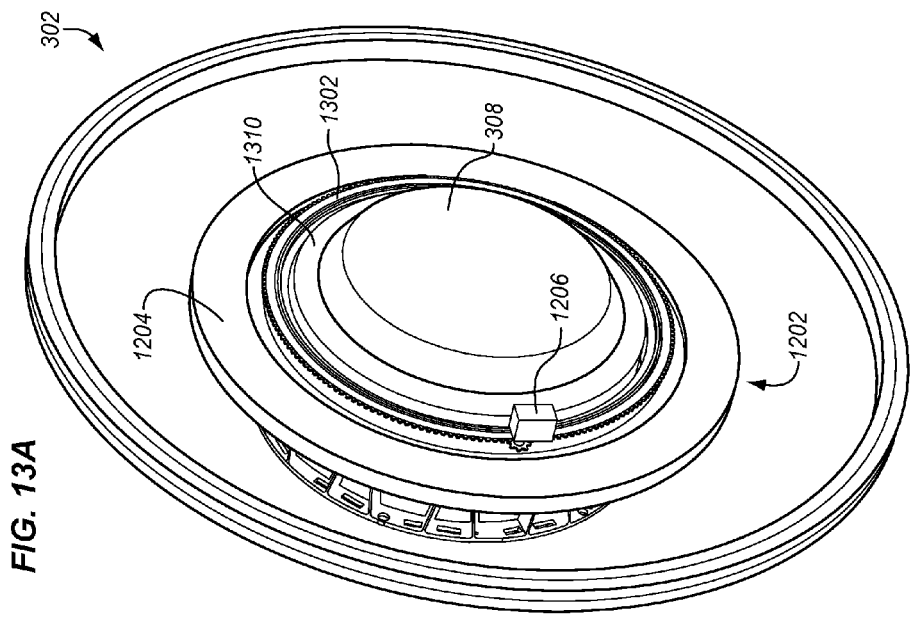

ARTIFICIAL GRAVITY SYSTEM WITH A ROTATING STRUCTURE THAT ROTATES ABOUT A STATIONARY STRUCTURE

RELATED APPLICATIONS

This non-provisional patent application is a continuation-in-part of U.S. patent application Ser. No. 15/052,383 filed on Feb. 24, 2016, which is incorporated herein by reference.

FIELD

This disclosure relates to the field of habitation modules that provide artificial gravity environments.

BACKGROUND

When humans occupy a space station, they encounter a zero-gravity environment or "weightless" environment. Extended exposure to a zero-gravity environment can be detrimental to the health of the human occupants, such as muscle and bone degeneration. To avoid these long-term health effects, artificial gravity environments may be installed in the space station. One way to create artificial gravity is with centrifugal force, where a vessel rotates at a speed that drives a human occupant inside of the vessel toward the outer hull of the vessel. The force on the human occupant feels like a gravitational pull.

Because of the health benefits and comfort of artificial gravity, it is desirable to design improved artificial gravity environments for space habitats/vehicles.

SUMMARY

Embodiments described herein include a habitation module for a space station or the like that includes one or more pairs of gravity chambers. The habitation module includes a stationary structure and a rotating structure that is slid upon the stationary structure. The rotating structure includes a cylindrical hub and one or more pairs of gravity chambers that extend radially from the hub in opposite directions. The hub is driven to rotate about an axis in relation to the stationary structure to create artificial gravity within each of the gravity chambers. As an artificial gravity environment is created in the gravity chambers, crew members may enter the gravity chambers for exercise, rest, lounging, or other activities.

It may be beneficial to have the interior portions of the hub and the gravity chambers pressurized so that crew members don't need to wear pressurized suits when in the gravity chambers. To create a pressurized environment, radial seals are installed at the connection points between the hub and the stationary structure of the habitation module. The radial seals provide an air-tight juncture between the rotating hub and the stationary structure of the habitation module. Therefore, even though the hub is rotating to provide an artificial gravity environment within the gravity chambers, the interior of the hub and the gravity chambers may be pressurized.

One embodiment comprises a habitation module comprising a stationary structure and a rotating structure. The stationary structure includes a first circular side wall, a second circular side wall spaced apart from the first circular side wall and aligned axially, and one or more support beams that attach the first circular side wall and the second circular side wall. The rotating structure rotates about an axis in relation to the stationary structure. The rotating structure includes a cylindrical hub comprising a hollow cylinder that slides onto the stationary structure, and connects to the first circular side wall and the second circular side wall through rotatable attachment members. The cylindrical hub includes a plurality of portals spaced radially around a circumference of the cylindrical hub. The rotating structure further includes a plurality of gravity chambers that are permanently affixed to the cylindrical hub about the portals, and project radially from the axis. The habitation module includes a first radial seal that spans a first gap between the cylindrical hub and the first circular side wall to form an air-tight seal around a circumference of the first circular side wall, and a second radial seal that spans a second gap between the cylindrical hub and the second circular side wall to form an air-tight seal around a circumference of the second circular side wall.

In another embodiment, the habitation module further includes a drive mechanism configured to rotate the rotating structure about the axis in relation to the stationary structure to simulate a gravitational force within the gravity chambers, and a ring gear affixed to the cylindrical hub and having teeth that mesh with teeth on the drive mechanism.

In another embodiment, the rotatable attachment members comprise a pair of support bearings. A first one of the support bearings connects the cylindrical hub to the first circular side wall, and a second one of the support bearings connects the cylindrical hub to the second circular side wall.

In another embodiment, one or more of the gravity chambers comprises a hollow cylindrical enclosure that includes an outer wall, an inner wall, and a cylindrical side wall that connects the outer wall and the inner wall. The gravity chamber also includes a passage tube that projects from the inner wall of the hollow cylindrical enclosure. The passage tube is permanently affixed around one of the portals of the cylindrical hub.

In another embodiment, an end of the passage tube is welded around one of the portals of the cylindrical hub.

In another embodiment, the rotating structure further includes one or more support members having a first end affixed to the cylindrical hub, and a second end affixed to the cylindrical side wall of a gravity chamber.

In another embodiment, one or more of the gravity chambers is an extendable gravity chamber. The extendable gravity chamber includes a hollow cylindrical enclosure that includes an outer wall and an inner wall, and includes a cylindrical side wall and an expandable side wall that connect the outer wall and the inner wall. The extendable gravity chamber also includes a passage tube that projects from the inner wall of the hollow cylindrical enclosure. The passage tube is permanently affixed around one of the portals of the cylindrical hub. The expandable side wall is sealed around a circumference of the cylindrical side wall and a circumference of the inner wall to form an airtight cavity within the extendable gravity chamber.

In another embodiment, an end of the passage tube is welded around one of the portals of the cylindrical hub.

In another embodiment, the rotating structure further includes guide members, where one end of each of the guide members is affixed to the cylindrical hub. The extendable gravity chamber includes guide connectors attached to the cylindrical side wall that are slidably connected to the guide members. The guide connectors slide along the guide members when the extendable gravity chamber is extended.

In another embodiment, the rotating structure further includes locking collars that are affixed to the guide members proximate to the one end of the guide members that is affixed to the cylindrical hub. The guide connectors attach to the locking collars to secure the extendable gravity chamber in a contracted position.

In another embodiment, the rotating structure further includes end collars that are affixed to the guide members proximate to a distal end of the guide members. The guide connectors attach to the end collars to secure the extendable gravity chamber in an extended position.

In another embodiment, the first circular side wall of the stationary structure includes a hatch, and the stationary structure further includes a docking mechanism that encircles the hatch for attaching the stationary structure to a module of a space station.

In another embodiment, the habitation module further includes a counter-rotating member that rotates about the axis in an opposite direction than the rotating structure.

In another embodiment, the first circular side wall of the stationary structure includes a hatch, and the counter-rotating member includes a cylindrical counter-weight that encircles the hatch, and a drive mechanism that rotates the cylindrical counter-weight about the axis in the opposite direction than the rotating structure.

In another embodiment, the drive mechanism adjusts a rotational speed of the cylindrical counter-weight to compensate for a change in mass within the gravity chambers.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIGS. 12, 13A, and 13B illustrate a counter-rotating mechanism in an exemplary embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
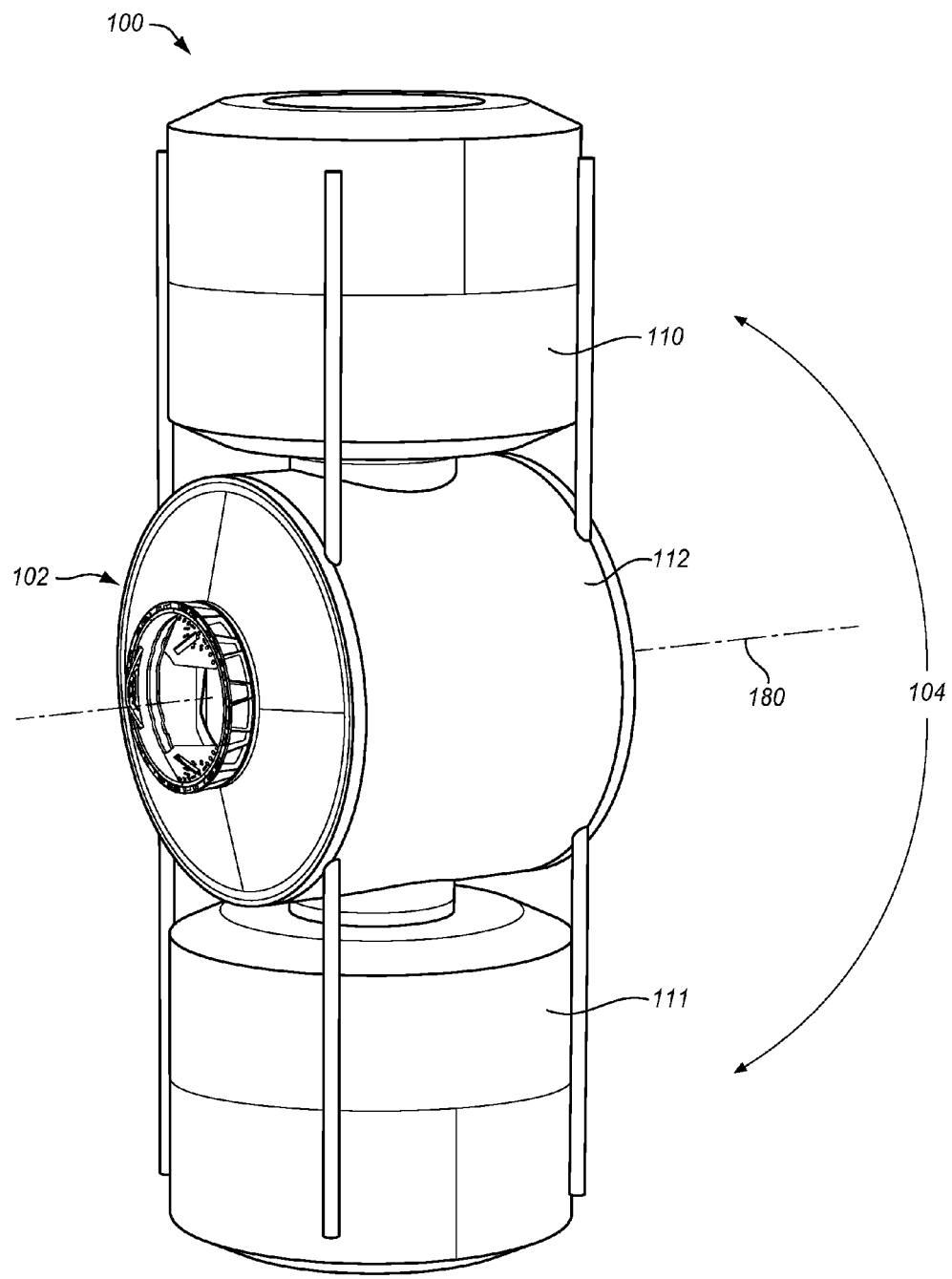
FIG. 1 illustrates a habitation module in an exemplary embodiment.

FIG. 1 illustrates a habitation module 100 in an exemplary embodiment. Habitation module (HAB) 100 is a module used for living quarters for crew members of a space station, such as the International Space Station. For example, HAB 100 may be used for sleeping quarters, restroom facilities, medical facilities, exercise facilities, etc. HAB 100 is configured for space vehicles in Low-Earth Orbit (LEO) or Beyond Low-Earth Orbit (BLEO).

HAB 100 includes a stationary structure 102 and a rotating structure 104 configured to rotate in relation to stationary structure 102 about an axis 180. Rotating structure 104, as described in more detail below, includes one or more gravity chambers 110-111 affixed around a cylindrical hub 112. Gravity chambers 110-111 comprise the pods or compartments of HAB 100 where crew members may experience artificial gravity. Crew members are able to enter the interiors of gravity chambers 110-111. With crew members inside, gravity chambers 110-111 are driven to rotate at a speed about axis 180 to create an artificial gravity environment within gravity chambers 110-111. For example, gravity chambers 110-111 may be driven at 5 rpm, 10 rpm, 12 rpm, etc., to generate simulated gravity, such as in the range of 0.2 G to 1 G. The speed of rotation is adjustable depending on the comfort of the crew members and the desired artificial gravity inside of gravity chambers 110-111.

Figure 2:
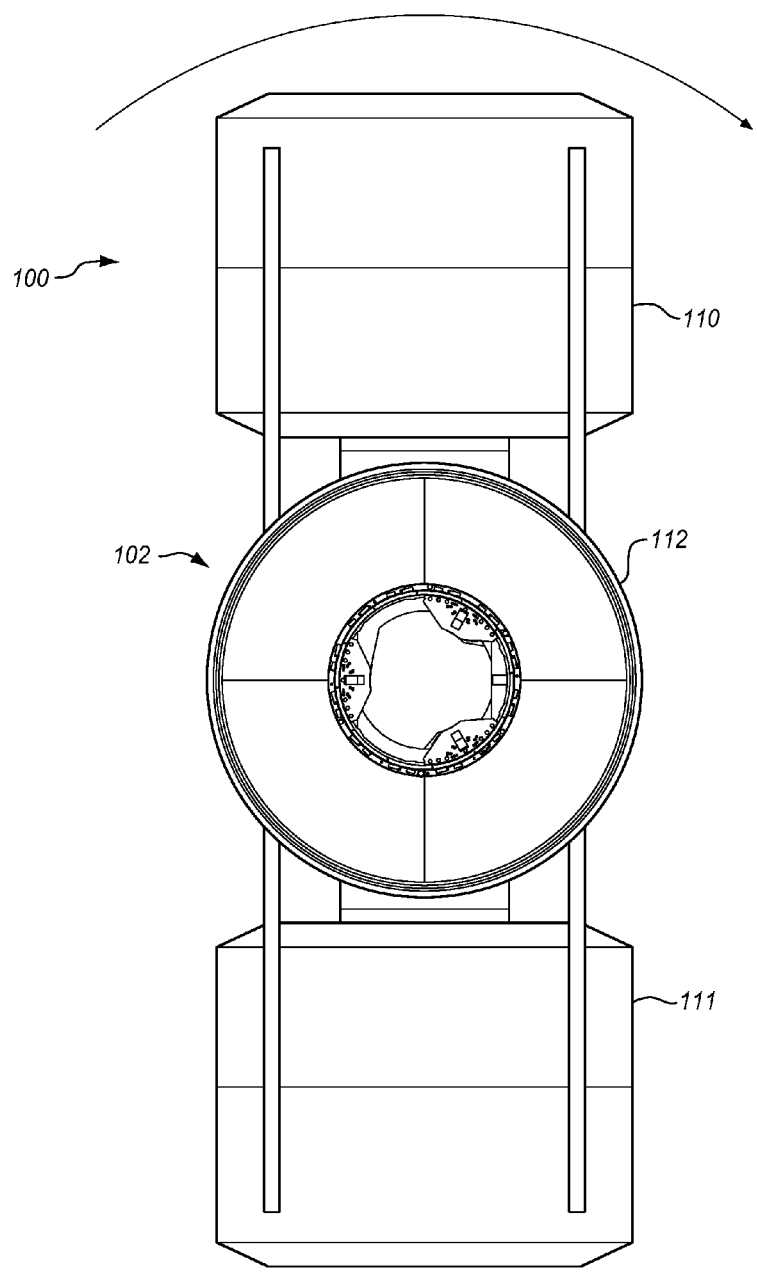
FIG. 2 is a side view of a habitation module in an exemplary embodiment.

FIG. 2 is a side view of HAB 100 in an exemplary embodiment. For the view in FIG. 2, axis 180 from FIG. 1 is into and out of the page. In the embodiments described below, gravity chambers 110-111 are driven to spin in relation to stationary structure 102 about axis 180 (see also FIG. 1) like spokes on wheel. The rotation about axis 180 creates a centrifugal force 202 on objects (e.g., crew members) inside of gravity chambers 110-111. The centrifugal force 202 feels like gravity to crew members inside of gravity chambers 110-111. Although two gravity chambers 110-111 are illustrated in FIGS. 1-2, HAB 100 may be equipped with more or less gravity chambers 110-111 as desired. To balance rotation of gravity chambers 110-111 about axis 180, it may be desirable to install the gravity chambers 110-111 in opposing pairs about axis 180. An opposing pair of gravity chambers will extend radially from stationary structure 102 in opposite directions (i.e., about 180° apart). The opposing pairs of gravity chambers may have similar size and weight to assist in balancing rotation.

Figure 3:
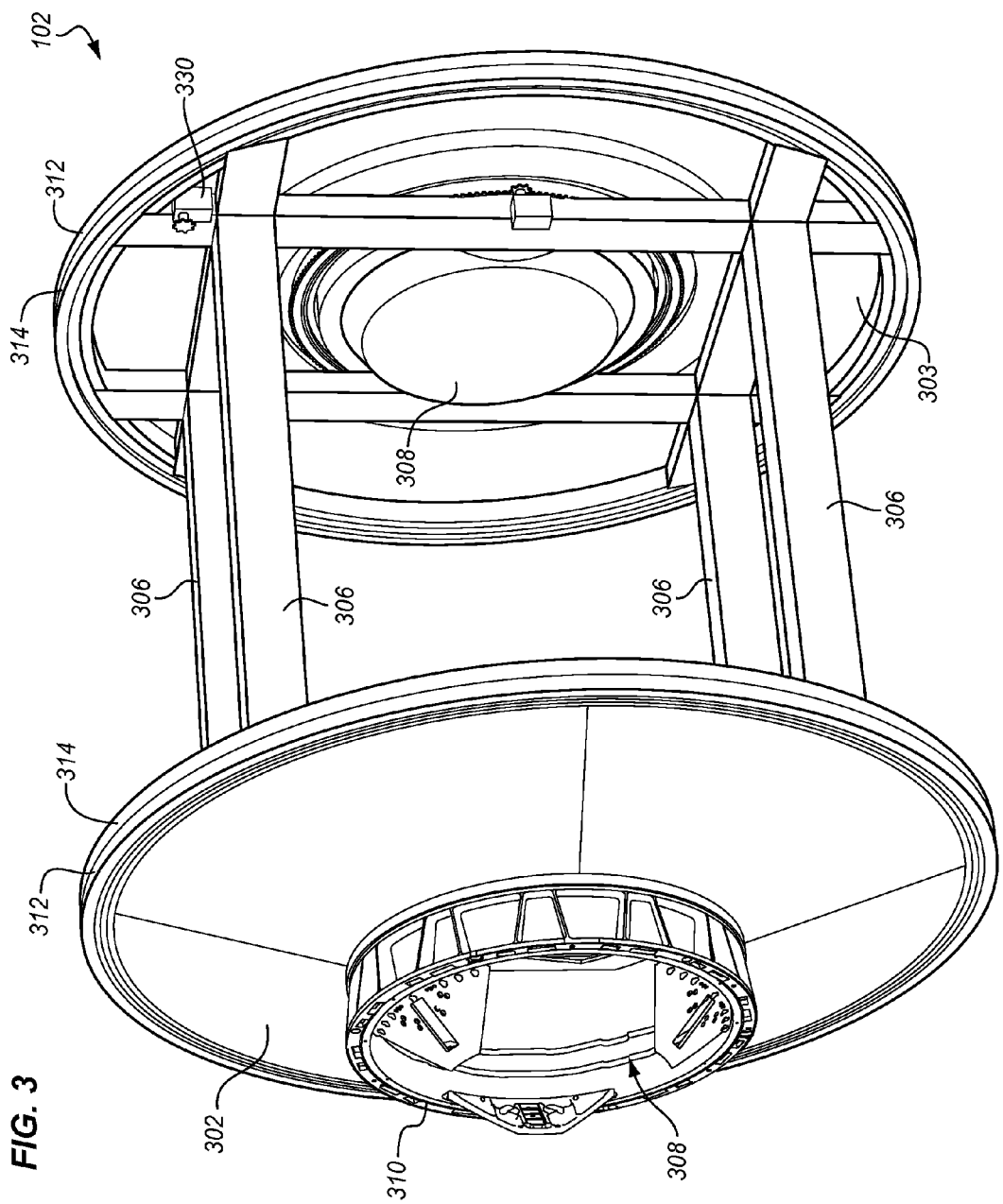
FIGS. 3-4 illustrate a stationary structure of a habitation module in an exemplary embodiment.
Figure 4:
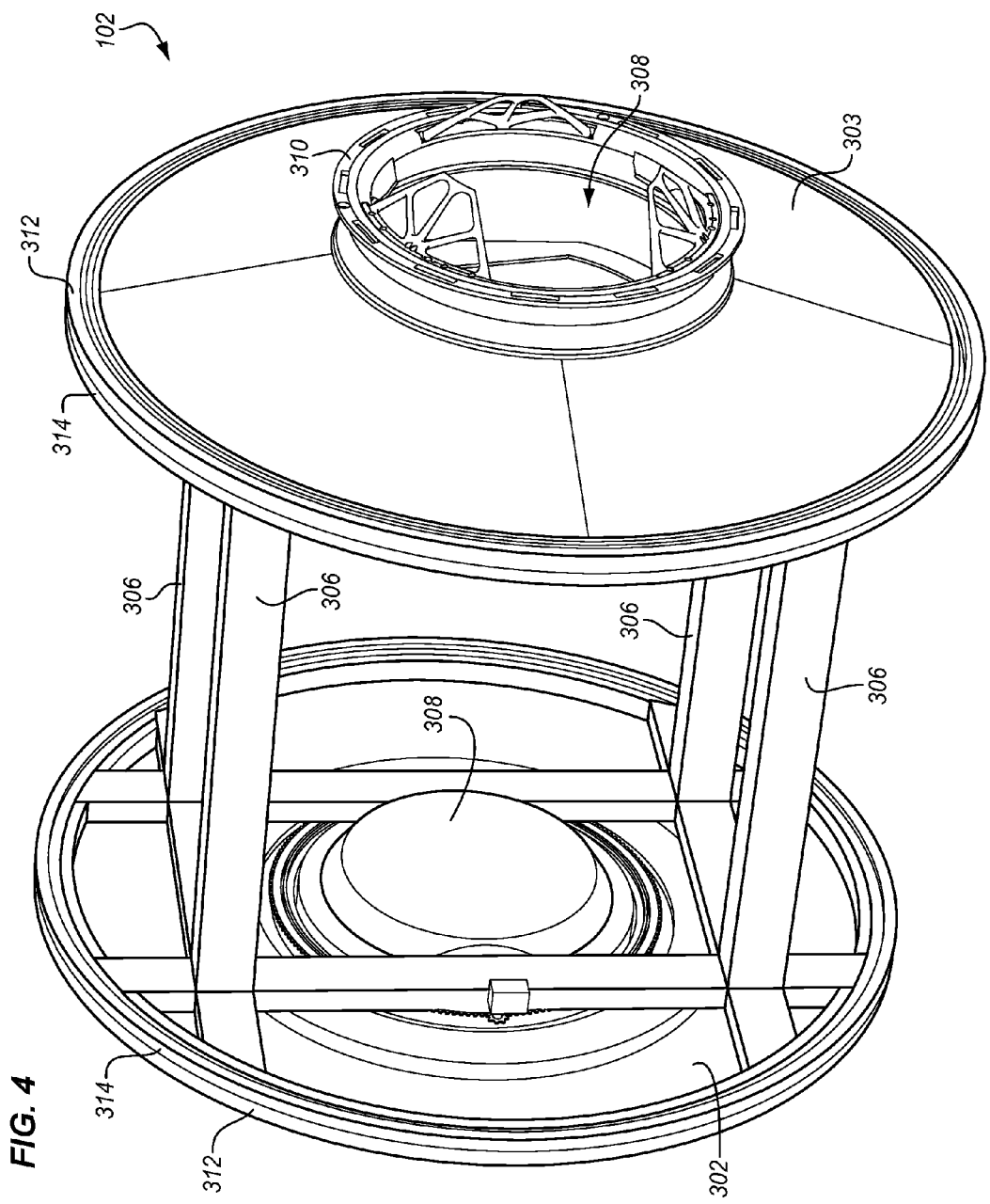

FIGS. 3-4 illustrate stationary structure 102 in an exemplary embodiment. Stationary structure 102 generally has a cylindrical profile so that rotating structure 104 can slide over and onto stationary structure 102 (see FIG. 1). To create the cylindrical profile, stationary structure 102 includes side walls 302-303 connected by one or more support beams 306. Each side wall 302-303 has a circular or disk shape. Both side walls 302-303 include a hatch 308 that is located towards the center of side wall 302-303, and may be opened by a crew member to pass through side wall 302-303. One or both of side walls 302-303 may include an active or passive docking mechanism 310 that encircles hatch 308. A docking mechanism (or berthing mechanism) 310 comprises any mechanism that forms an air-tight or pressure-tight seal between side wall 308 and another module, such as a module of a space station. This allows stationary structure 102 to be attached to a space station, and put into operation. Support beams 306 are members that provide a support structure between side walls 302-303. Side walls 302-303 are spaced apart and aligned co-axially with one another via support beams 306. In the exemplary embodiment shown in FIGS. 3-4, four support beams 306 are attached between side walls 302-303, although more or less support beams 306 may be used in other embodiments. Support beams 306 are connected to regions of side walls 302-303 outside of hatch 308 so as to not interfere with passage of crew members through hatch 308. Although support beams 306 are shown as extending between side walls 302-303 in parallel with the center axis of side walls 302-303 in this embodiment, support beams 306 may extend diagonally between side walls 302-303 in other embodiments.

Figure 5:
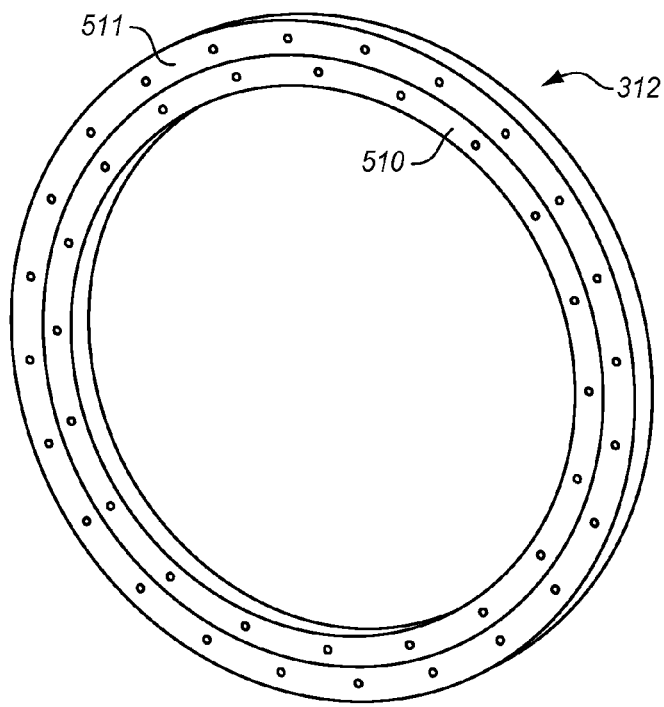
FIG. 5 illustrates a support bearing in an exemplary embodiment.

To allow rotating structure 104 to rotate in relation to stationary structure 102 (see FIG. 1), rotating structure 104 may attach to stationary structure 102 with rotatable attachment members, such as support bearings 312. Support bearings 312 are annular or ring-shaped, and attach around the outer circumference of side walls 302-303. FIG. 5 illustrates a support bearing 312 in an exemplary embodiment. Support bearing 312 includes an inner race (or ring) 510, an outer race (or ring) 511, and a rolling element between inner race 510 and outer race 511 that enables rotational movement (not visible in FIG. 5). The rolling element may comprise ball bearings, cylindrical rollers, or the like. Inner race 510 is configured to attach to a side wall 302-303 of stationary structure 102, while outer race 511 is configured to attach to rotating structure 104.

Figure 6:
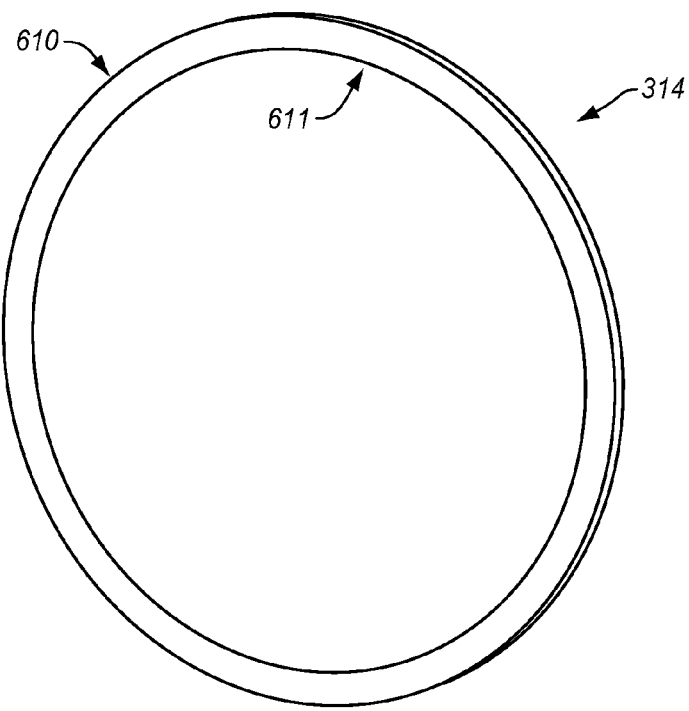
FIG. 6 illustrates a radial seal in an exemplary embodiment.

Although rotating structure 104 is able to rotate in relation to stationary structure 102, the attachment point or juncture between rotating structure 104 and stationary structure 102 is sealed so that the interior of HAB 100 may be pressurized (e.g., to 1 atmosphere). Any gap or seam between rotating structure 104 and stationary structure 102 at their attachment point is sealed with radial seals 314. FIG. 6 illustrates radial seal 314 in an exemplary embodiment. In this embodiment, radial seal 314 is configured to attach around the outer circumference of a side wall 302-303. Radial seal 314 includes an inner surface 611 that is configured to contact a surface of a side wall 302-303, and an outer surface 610 that is configured to contact a surface of rotating structure 104 to form an air-tight or pressure-tight seal. A cross-section of radial seal 314 may have any desired shape, such as rectangular, round, ribbed, etc.

Figure 7:
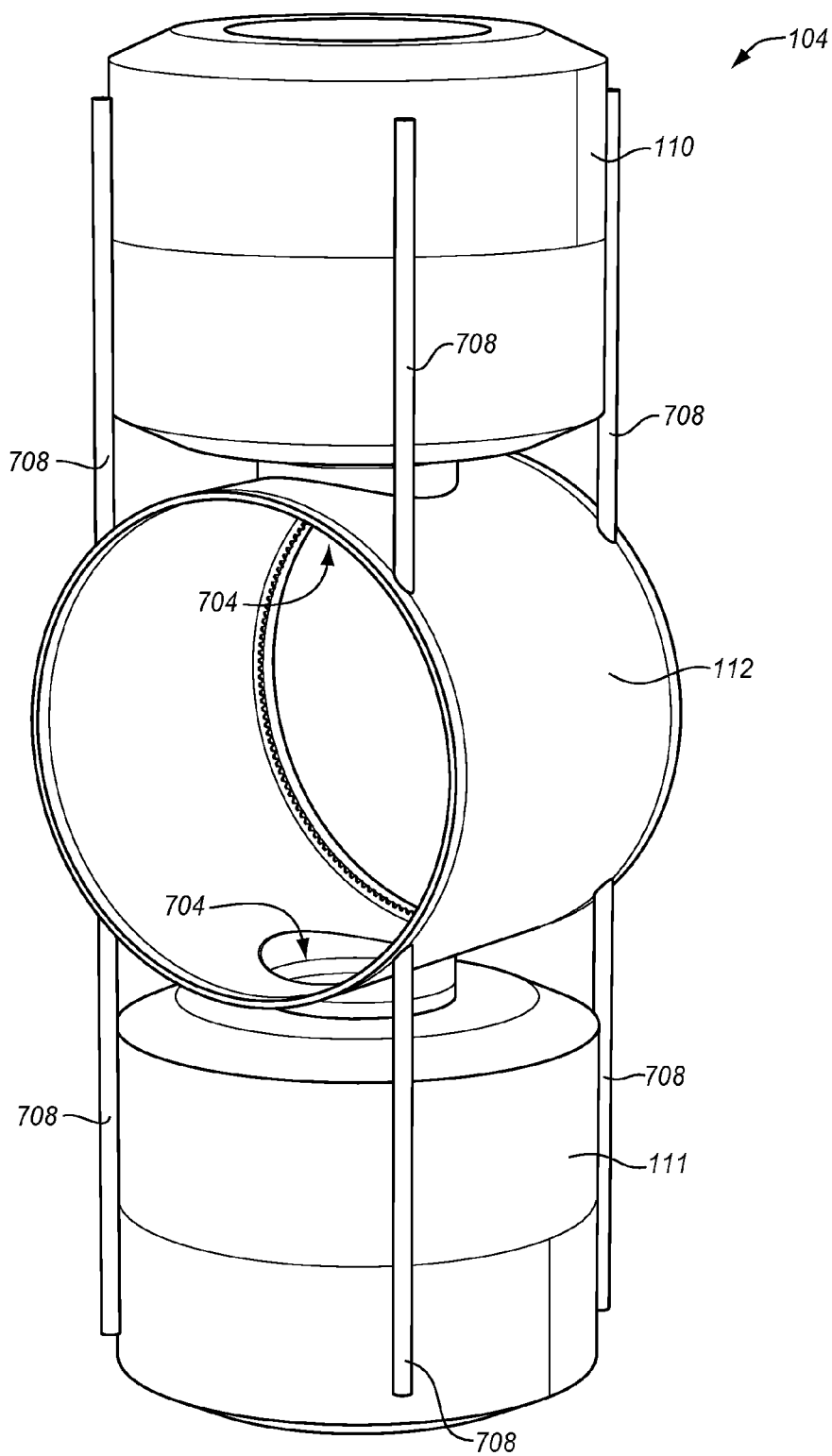
FIG. 7 illustrates a rotating structure of a habitation module in an exemplary embodiment.

FIG. 7 illustrates rotating structure 104 in an exemplary embodiment. Rotating structure 104 includes cylindrical hub 112 and at least one pair of gravity chambers 110-111. Cylindrical hub 112 has a hollow cylindrical shape, and includes a plurality of portals 704 that are spaced radially around the circumference of cylindrical hub 112. Portals 704 are openings in cylindrical hub 112 that provide passageways between the interior of cylindrical hub 112 and the interiors of gravity chambers 110-111. Rotating structure 104 may also include support members 708 to support gravity chambers 110-111, which is described in more detail below.

Figure 8:
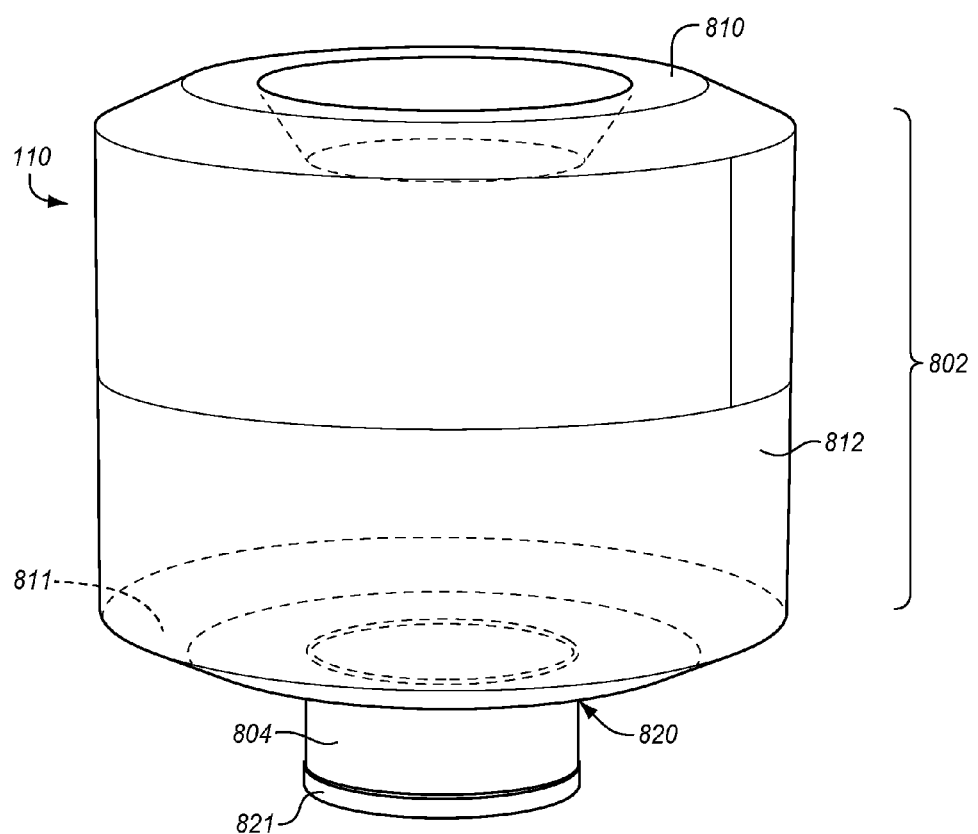
FIG. 8 illustrates a gravity chamber of a habitation module in an exemplary embodiment.

FIG. 8 illustrates gravity chamber 110 in an exemplary embodiment. In this embodiment, gravity chamber 110 is cylindrical and may have a diameter that is about 4.3 meters or less. The diameter of gravity chamber 110 may be limited by the size of the launch vehicle used to transport HAB 100 into space. For example, an Atlas rocket from NASA may be used to transport HAB 100 into space, and the diameter of gravity chamber 110 may be constrained by the size of the Atlas rocket, which is typically about 4.3 meters. Although gravity chamber 110 has a cylindrical shape in FIG. 8, the shape of gravity chamber 110 may have different shapes in other embodiments.

The interior of gravity chamber 110 may be hollow or empty to form open quarters for crew members. The interior of gravity chamber 110 may include a treadmill, an exercise bike, or any other exercise equipment. The interior of gravity chamber 110 may include restroom facilities (e.g., a shower, a toilet, a sink, etc.), office facilities (e.g., a desk, chairs, cabinets, etc.), lounge facilities (e.g., chairs, a couch, etc.), sleeping facilities (e.g., a bed), or any other facilities. Gravity chamber 110 may also be compartmentalized into individual rooms.

The structure of gravity chamber 110 includes a hollow cylindrical enclosure 802 and a passage tube 804 that projects from enclosure 802. Enclosure 802 has an outer wall 810, an inner wall 811, and a cylindrical side wall 812 that extends between outer wall 810 and inner wall 811. Outer wall 810, which will serve as the floor of gravity chamber 110, and side wall 812 may be made from a thin metal, a composite material, a plastic, or another type of rigid material. The interior of outer wall 810 and side wall 812 may be lined with a rubber, padding, or any other material that protects crew members inside of gravity chamber 110. Side wall 812 may also include one or more windows, and outer wall 810 may include an emergency hatch (not shown in FIG. 8).

Inner wall 811, which will serve as the ceiling of gravity chamber 110, attaches to passage tube 804. Passage tube 804 is a cylinder that is substantially hollow, and provides a passage way for crew members to pass between gravity chamber 110 and an interior of cylindrical hub 112. Passage tube 804 may include a ladder, steps, or some type of mechanism to assist crew members in traveling through passage tube 804.

Gravity chamber 111 may have a similar structure as gravity chamber 110 as shown in FIG. 8.

In FIG. 7, rotating structure 104 is a unitary structure, where gravity chambers 110-111 are affixed, attached, joined, etc., to cylindrical hub 112 in a permanent fashion. One end 820 of passage tube 804 (see FIG. 8) is affixed to inner wall 811 of gravity chamber 110, and the other end 821 of passage tube 804 is affixed to cylindrical hub 112. For example, end 821 of passage tube 804 may be welded to cylindrical hub 112 around portal 704 to permanently join gravity chamber 110 to cylindrical hub 112. The connection point between gravity chamber 110 and cylindrical hub 112 is a pressure-tight seal. Being "permanently" affixed refers to a connection between structural members that is intended to remain unchanged, such as a weld. Because gravity chambers 110-111 are permanently affixed to cylindrical hub 112, a berthing mechanism (e.g., a Common Berthing Mechanism (CBM)) is not needed between gravity chambers 110-111 and cylindrical hub 112. Rotating structure 104 may be assembled on Earth before being sent up to space, with gravity chambers 110-111 being permanently affixed to cylindrical hub 112. Therefore, berthing mechanisms are not needed between gravity chambers 110-111 and cylindrical hub 112 such as in scenarios where a structure is assembled in space.

Figure 9:
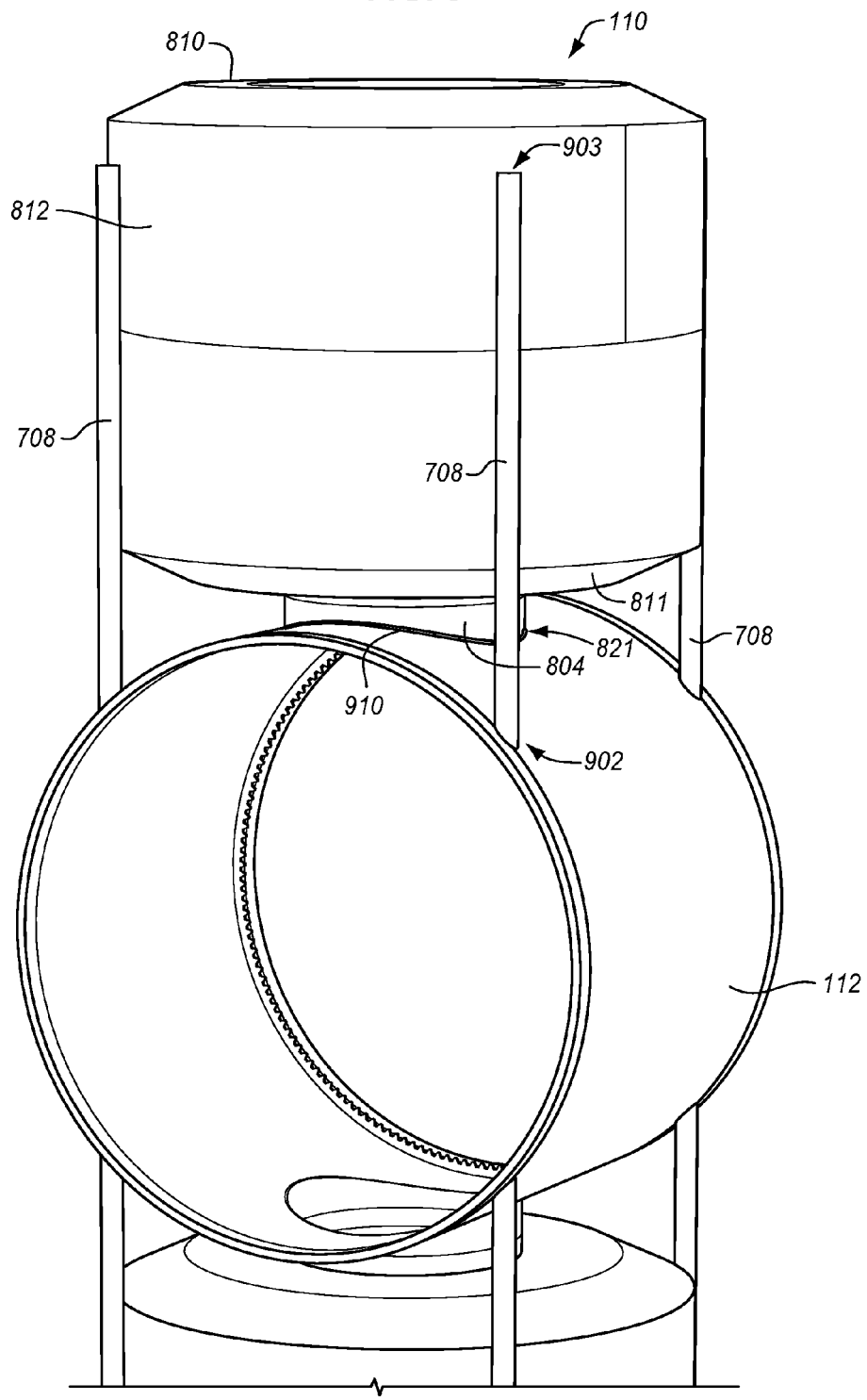
FIG. 9 is a magnified view of a rotating structure of a habitation module in an exemplary embodiment.

FIG. 9 is a magnified view of rotating structure 104 in an exemplary embodiment. Although portals 704 of cylindrical hub 112 are not visible, end 821 of passage tube 804 is permanently affixed to cylindrical hub 112 around portal 704. A weld 910 may be used to permanently affix end 821 of passage tube 804 to cylindrical hub 112, although other means may be used in other embodiments. Rotating structure 104 may also include one or more support members 708 to affix gravity chambers 110-111 to cylindrical hub 112. Support members 708 are configured to reinforce the attachment between gravity chambers 110-111 and cylindrical hub 112. One end 902 of a support member 708 is affixed (e.g., permanently) to cylindrical hub 112 (via a weld, bolt, etc.), while the other (distal) end 903 of support member 708 is affixed to gravity chamber 110 (or gravity chamber 111). Support member 708 may connect to side wall 812 as illustrated in FIG. 9, or may connect to inner wall 811 or outer wall 810 as desired.

Figure 10:
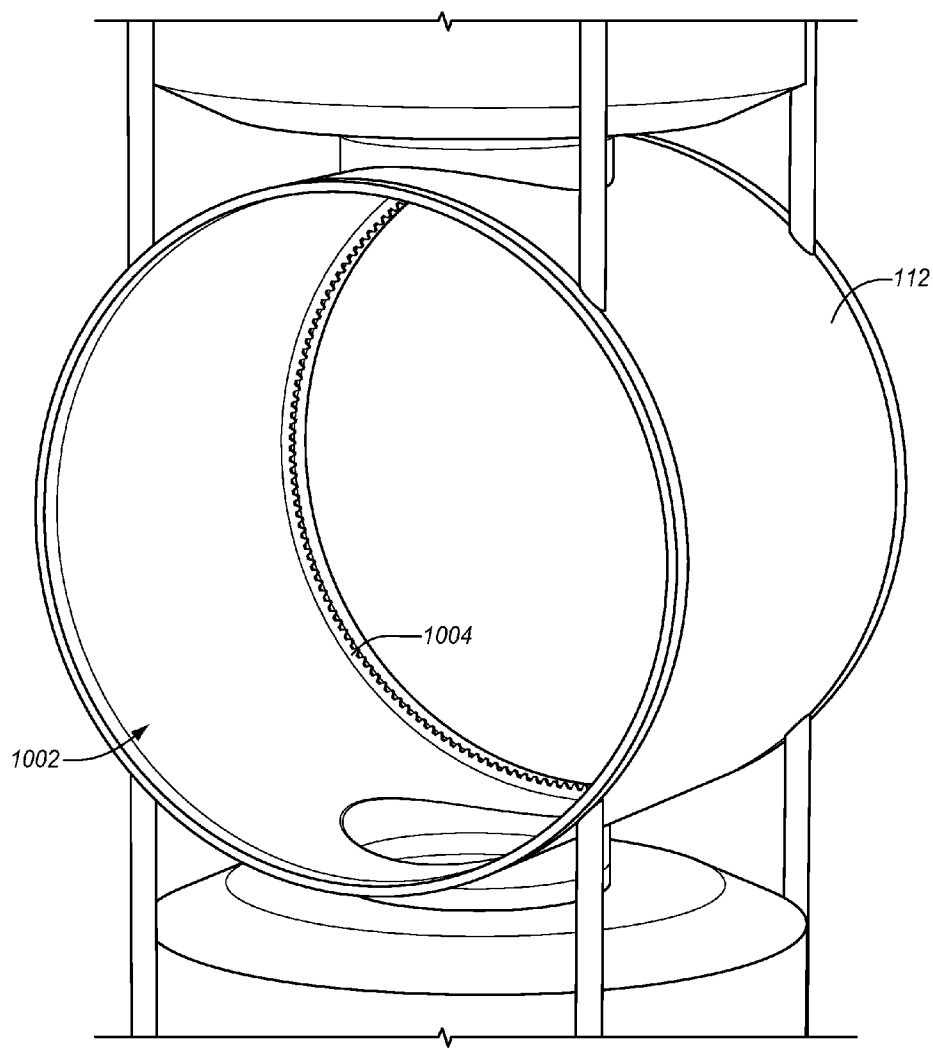
FIG. 10 is a magnified view of a cylindrical hub in an exemplary embodiment.
Figure 11:
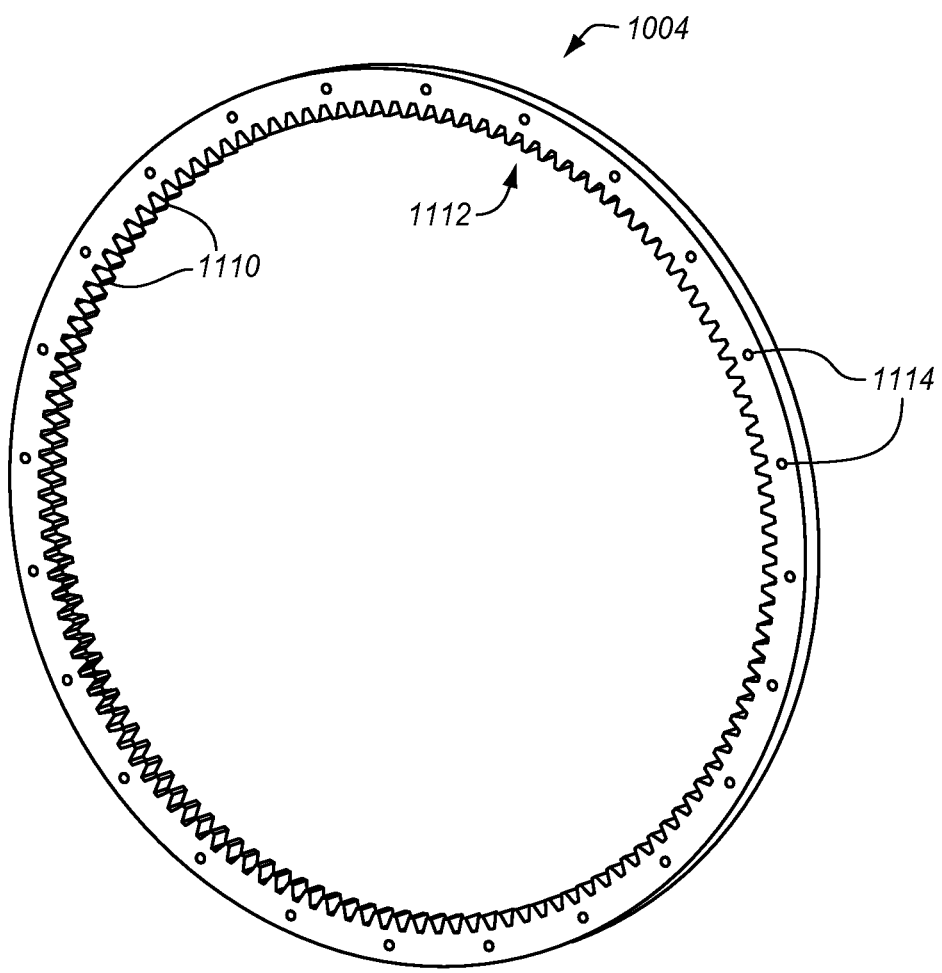
FIG. 11 illustrates a ring gear in an exemplary embodiment.

To spin rotating structure 104 around stationary structure 102, a ring gear may be affixed to an inner surface of cylindrical hub 112. FIG. 10 is a magnified view of cylindrical hub 112 in an exemplary embodiment. Cylindrical hub 112 includes an inner surface 1002, and ring gear 1004 is affixed to inner surface 1002 to mate with a drive mechanism. FIG. 11 illustrates ring gear 1004 in an exemplary embodiment. In this embodiment, ring gear 1004 includes a plurality of teeth 1110 on an inner surface 1102 for meshing with a drive gear of a drive mechanism of HAB 100, such as drive mechanism 330 shown in FIGS. 3-4. Ring gear 1004 may bolt or otherwise attach to the inner surface 1002 of cylindrical hub 112 via holes 1114. Although one ring gear 1004 is illustrated in FIG. 10, a ring gear 1004 may be affixed to each side of cylindrical hub 112 to drive cylindrical hub 112 from both sides. Drive mechanism 330 (see FIGS. 3-4) is placed proximate or adjacent to ring gear 1004, and is configured to spin a drive gear to impart rotational movement to ring gear 1004. Teeth on the drive gear of drive mechanism 330 mesh with teeth 1110 of ring gear 1004. When drive mechanism 330 turns its drive gear, it imparts rotational movement on cylindrical hub 112 about axis 180 (see FIG. 1). Drive mechanism 330 may comprise an electric motor, a hydraulic motor, a pneumatic motor, or any other actuating device that has a variable rotational speed.

When rotating structure 104 is slid onto stationary structure 102 as shown in FIG. 1 and attached via support bearings 312, radial seals 314 span a gap between cylindrical hub 112 and stationary structure 102 to create an air-tight or pressure-tight seal around a circumference of the side walls 302-303 of stationary structure 102. Therefore, the interior of cylindrical hub 112 and gravity chambers 110-111 may be pressurized. Also, drive mechanism 330 (see FIG. 3) meshes with ring gear 1004. Drive mechanism 330 can therefore impart rotation movement of rotating structure 104 about axis 180. Crew members may access gravity chambers 110-111 to experience an artificial gravity environment. As gravity chambers 110-111 rotate about axis 180 (see FIG. 2), the centrifugal force 202 created will pull a crew member towards outer wall 810 (i.e., floor) of gravity chambers 110-111. The amount of force on an object depends on the angular velocity of rotation and the distance of the object from the axis of rotation. Although the dimensions of gravity chamber 110 may vary as desired, the distance of outer wall 810 of gravity chambers 110-111 may be about 4 meters or less from axis 180.

When inside of gravity chamber 110, for example, a crew member will experience the artificial gravity environment created by rotation of gravity chamber 110 about axis 180. The force created by rotation of gravity chamber 110 about axis 180 pushes the crew member against end wall 810, which feels like gravity. That way, the crew member may sleep, exercise, etc., within gravity chamber 110 in an artificial gravity environment, which has health benefits such as reduced muscle and bone degeneration. Also, when in use, the interiors of cylindrical hub 112 and gravity chambers 110-111 are pressurized and temperature-controlled so that a crew member does not need to wear a specialize suit. Even though cylindrical hub 112 rotates in relation to stationary structure 102, the attachment points between cylindrical hub 112 and stationary structure 102 are sealed so that an oxygen-supplied and thermally-controlled environment is created within the interiors of cylindrical hub 112 and gravity chambers 110-111. The pressurized and thermally-controlled environment is also advantageous within the interior of cylindrical hub 112, as drive unit 330 is readily accessible for replacement or repair, and bearings 312 and seals 314 are accessible for service.

Figure 12:
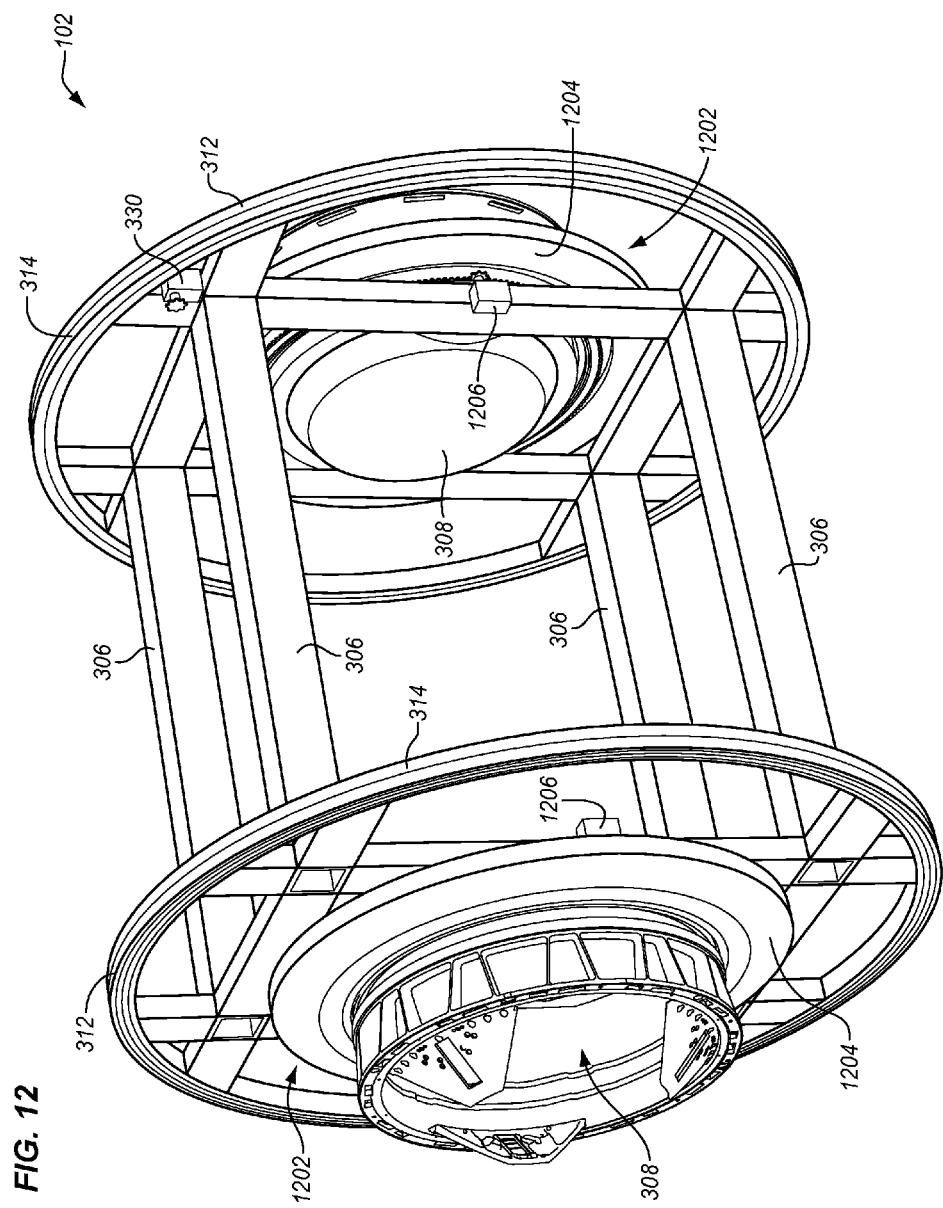

The rotation of gravity chambers 110-111 may create an unwanted momentum for HAB 100. To cancel out the unwanted momentum, a counter-rotating mechanism may be installed to rotate about axis 180 in an opposite direction than rotating structure 104. FIGS. 12, 13A, and 13B illustrate a counter-rotating mechanism 1202 in an exemplary embodiment. Counter-rotating mechanism 1202 is installed on stationary structure 102 (see FIG. 12). In this embodiment, counter-rotating mechanism 1202 includes a counter-weight 1204 that is an annular ring having a diameter greater than the diameter of hatch 308. Counter-weight 1204 does not have to be a continuous structure as shown in FIG. 12, but may be segmented and spaced around the circumference of hatch 308. Counter-weight 1204 is driven by a drive mechanism 1206 to rotate in the opposite direction of rotating structure 104 about axis 180 to negate momentum created by rotation of gravity chambers 110-111. As is further illustrated in FIGS. 13A-B, counter-rotating mechanism 1202 may be installed on both sides of cylindrical hub 112. On either side of cylindrical hub 112, counter-weight 1204 may be attached to an outer cylindrical surface 1310 of hatch 308 via a support bearing 1302. Support bearings 1302 may be ring-shaped as described above for support bearings 312.

Support bearings 1302 also includes teeth that mesh with a drive gear of drive mechanism 1206 so that drive mechanism 1206 can impart rotational movement to counter-weight 1204 in an opposite direction than rotating structure 104. Momentum is measured in mass multiplied by velocity (rotational). If it is assumed that the mass of counter-weight 1204 is fixed, then counter-weight 1204 is driven at a speed to compensate for the momentum created by rotation of rotating structure 104. If the mass of rotating structure 104 changes (e.g., crew members enter one of gravity chambers 110-111), then drive mechanism 1206 adjusts the rotational speed of counter-weight 1204 to compensate for the change in mass. The rotational speed of counter-weight 1204 is therefore adjusted so that there is a net-zero momentum change due to rotation of rotating structure 104.

Figure 14:
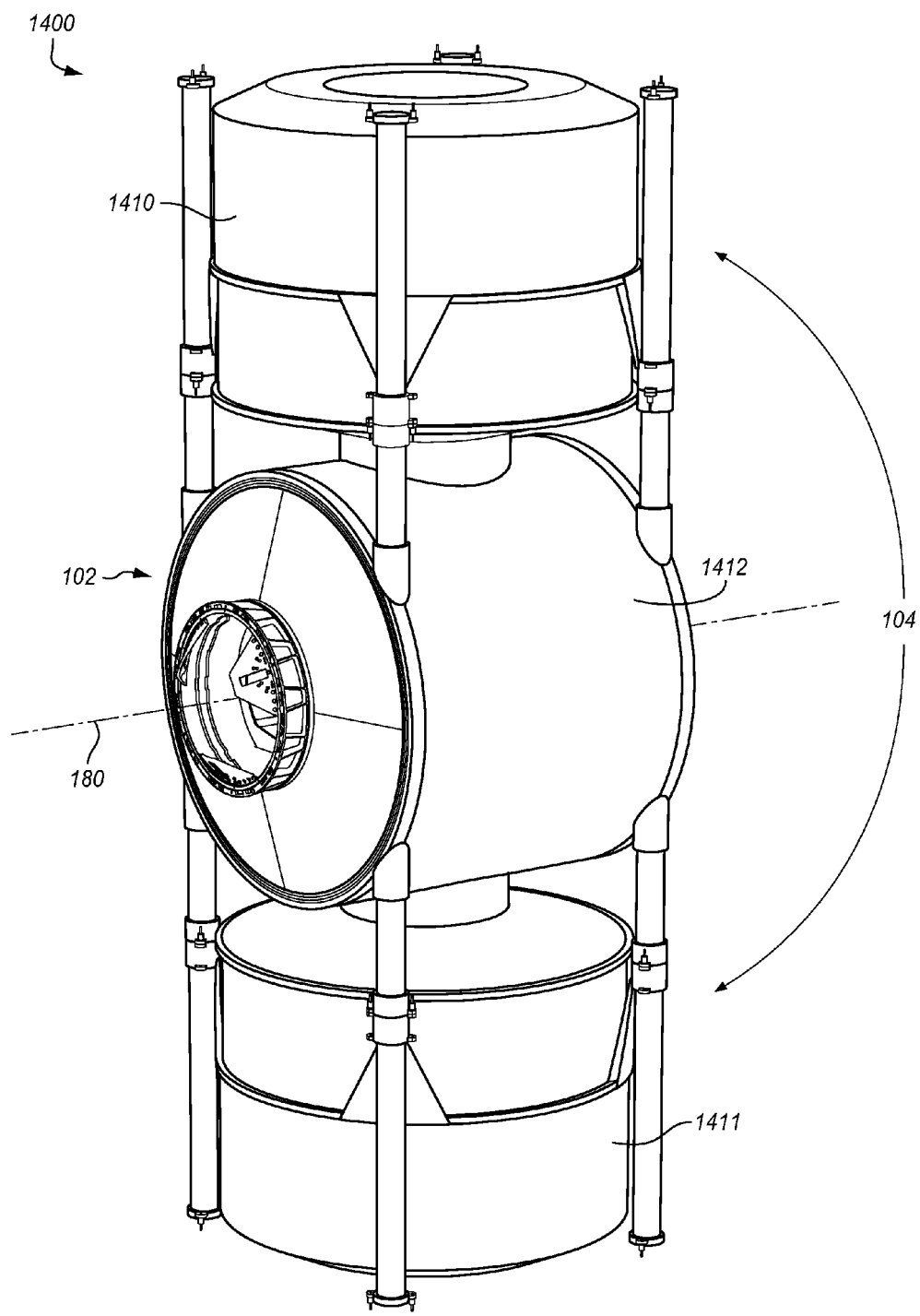
FIG. 14 illustrates another habitation module in an exemplary embodiment.

FIG. 14 illustrates another HAB 1400 in an exemplary embodiment. HAB 1400 is similar to HAB 100 with a stationary structure 102 and a rotating structure 104. Stationary structure 102 is similar to that as described above. Rotating structure 104 includes gravity chambers 1410-1411 that are affixed around a cylindrical hub 1412. However, the gravity chambers 1410-1411 in HAB 1400 are extendable in a radial direction to the axis 180 of rotation. This allows for the rotational radius of extendable gravity chambers 1410-1411 to be changed when HAB 1400 is put into service in space. As in the above embodiment, rotating structure 104 is a unitary structure, where gravity chambers 1410-1411 are affixed or joined to cylindrical hub 1412 in a permanent fashion.

Figure 15:
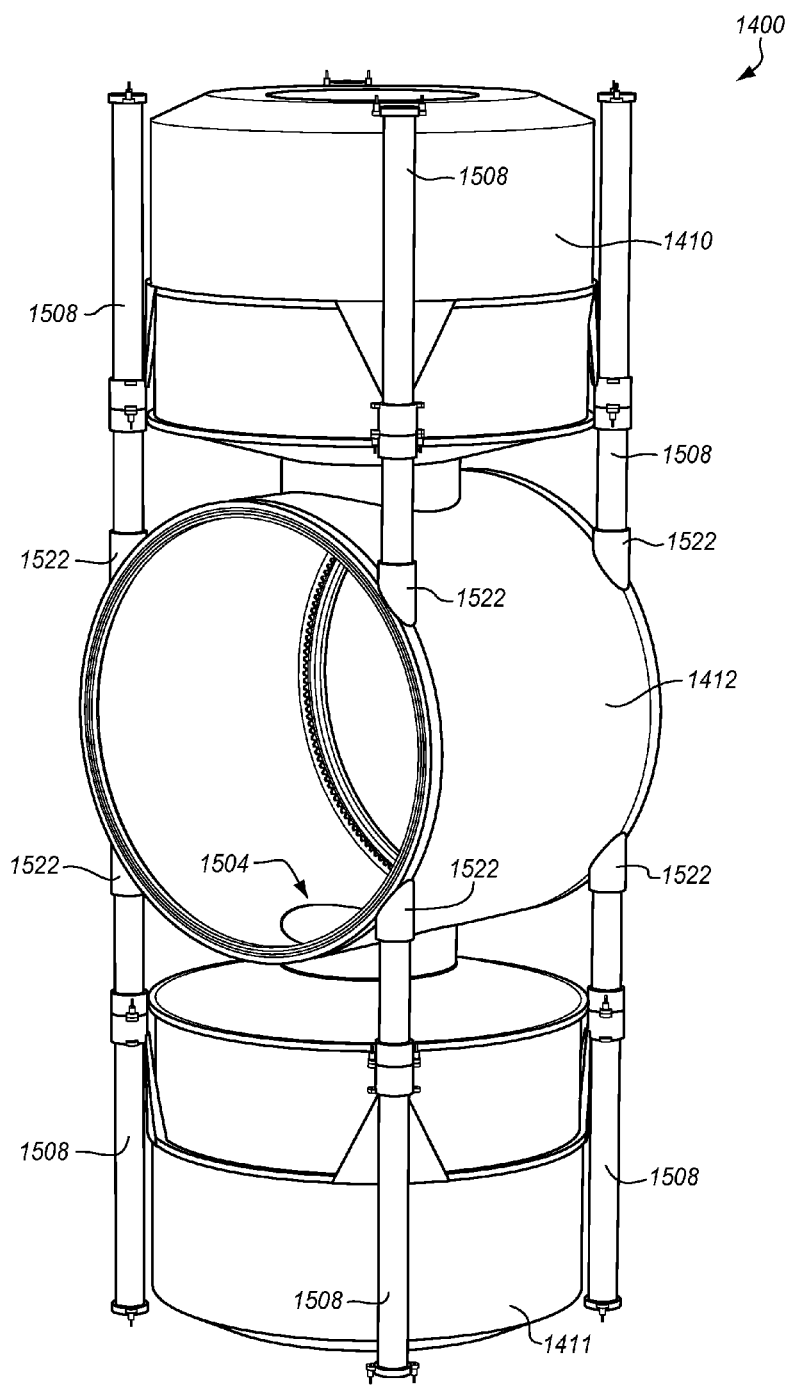
FIG. 15 illustrates a rotating structure of a habitation module in an exemplary embodiment.

FIG. 15 illustrates rotating structure 104 of HAB 1400 in an exemplary embodiment. Rotating structure 104 includes cylindrical hub 1412 and at least one pair of extendable gravity chambers 1410-1411. Cylindrical hub 1412 has a similar structure to cylindrical hub 112 as described above. Cylindrical hub 1412 has a hollow cylindrical shape, and includes a plurality of portals 1504 that are spaced radially around the circumference of cylindrical hub 1412.

Rotating structure 104 also includes one or more guide members 1508. Guide members 1508 are configured to guide extendable gravity chambers 1410-1411 when they extend radially from axis 180. One end 1522 of each guide member 1508 is affixed to cylindrical hub 1412 (via a weld, bolts, etc.), and guide members 1508 extend in a parallel fashion around extendable gravity chambers 1410-1411. Extendable gravity chambers 1410-1411 attach to guide members 1508 via a slidable connection so that extendable gravity chambers 1410-1411 can extend along guide members 1508.

Figure 16:
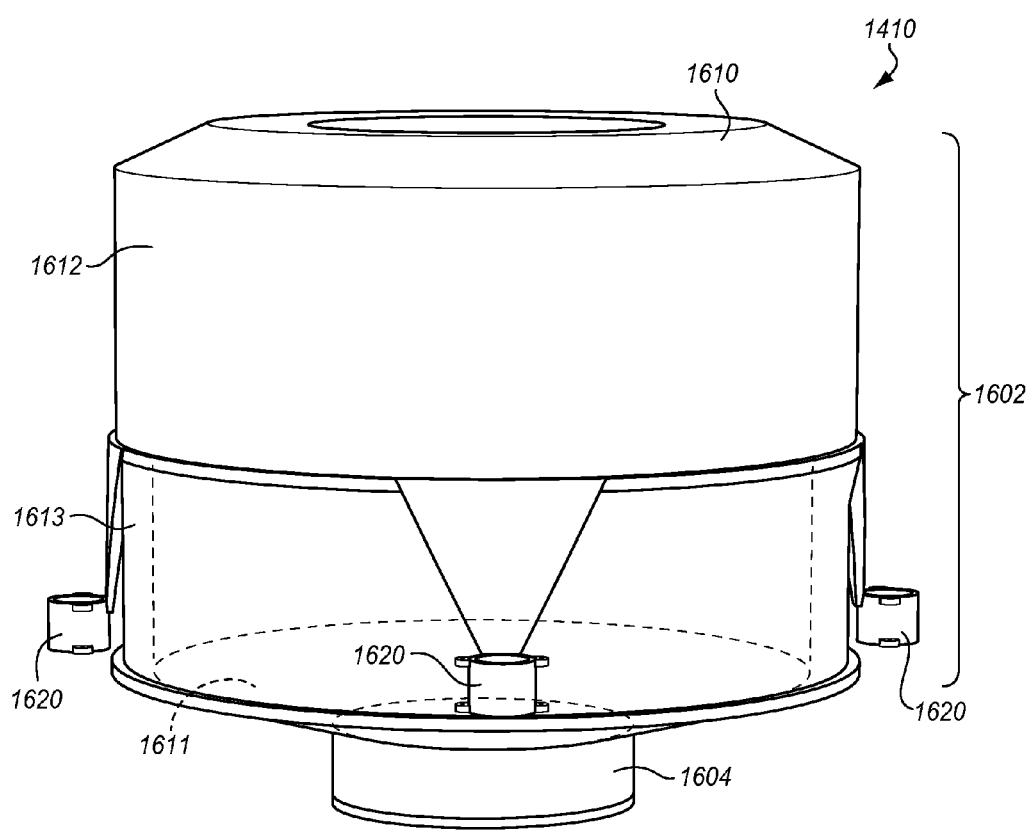
FIG. 16 illustrates an extendable gravity chamber of a habitation module in an exemplary embodiment.

FIG. 16 illustrates extendable gravity chamber 1410 in an exemplary embodiment. The structure of extendable gravity chamber 1410 includes a hollow cylindrical enclosure 1602 and a passage tube 1604 that projects from enclosure 1602. Enclosure 1602 has an outer wall 1610, an inner wall 1611, and also has a cylindrical side wall 1612 and an expandable side wall 1613 that extend between outer wall 1610 and inner wall 1611. Outer wall 1610, which will serve as the floor of extendable gravity chamber 1410, and side wall 1612 may be made from a thin metal, a composite material, a plastic, or another type of rigid material. The interior of outer wall 1610 and side wall 1612 may be lined with a rubber, padding, or any other material that protects crew members inside of extendable gravity chamber 1410. Inner wall 1611, which will serve as the ceiling of extendable gravity chamber 1410, attaches to passage tube 1604. Passage tube 1604 is a cylinder that is substantially hollow, and provides a passage way for crew members to pass between extendable gravity chamber 1410 and an interior of cylindrical hub 1412. Passage tube 1604 may include a ladder, steps, or some type of mechanism to assist crew members in traveling through passage tube 1604.

Expandable side wall 1613 is made from a material that expands or inflates to increase the distance between outer wall 1610 and inner wall 1611. Expandable side wall 1613 may be made from a folded canvas/plastic, or any other type of material. Expandable side wall 1613 is sealed around a circumference of cylindrical side wall 1612 and a circumference of inner wall 1611 to form an airtight cavity within extendable gravity chamber 1410. When in space, extendable gravity chamber 1410 may be filled with air or gas so that expandable side wall 1613 becomes distended. Extendable gravity chamber 1410 also includes guide connectors 1620, which are hollow cylinders that attach to cylindrical side wall 1612. Guide connectors 1620 are configured to slide over guide members 1508 (see FIG. 15) to guide extendable gravity chamber 1410 while being extended.

Extendable gravity chamber 1411 may have a similar structure as extendable gravity chamber 1410 as shown in FIG. 16, or may have a similar structure as gravity chamber 110 as shown in FIG. 8.

Figure 17:
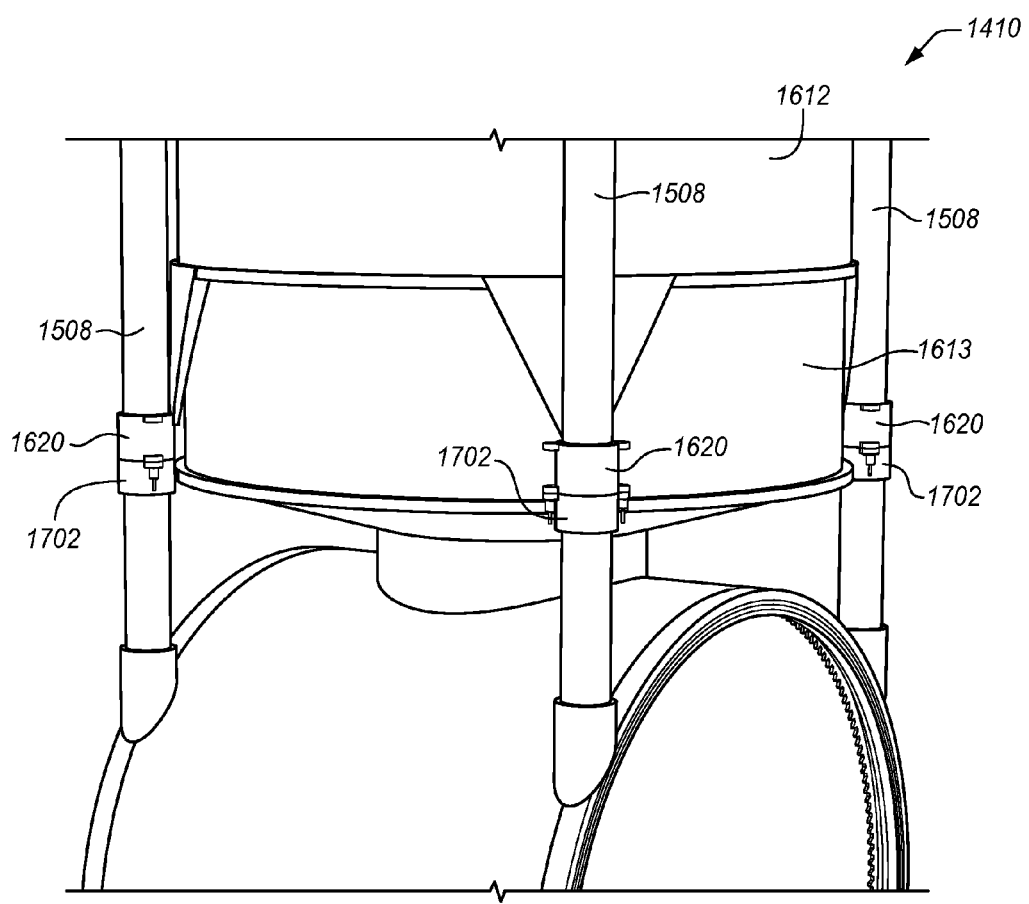
FIG. 17 is a magnified view of an extendable gravity chamber in a contracted position in an exemplary embodiment.

FIG. 17 is a magnified view of extendable gravity chamber 1410 in an exemplary embodiment. Extendable gravity chamber 1410 is in a contracted position in FIG. 17 (as with FIGS. 14-15). The contracted position may be used when HAB 1400 is loaded into a launch vehicle and transported into space. To secure extendable gravity chamber 1410 in a contracted position, locking collars 1702 are affixed to guide members 1508. Guide connectors 1620 are then affixed (e.g., bolted) to locking collars 1702 to secure extendable gravity chamber 1410 in the contracted position.

Figure 18:
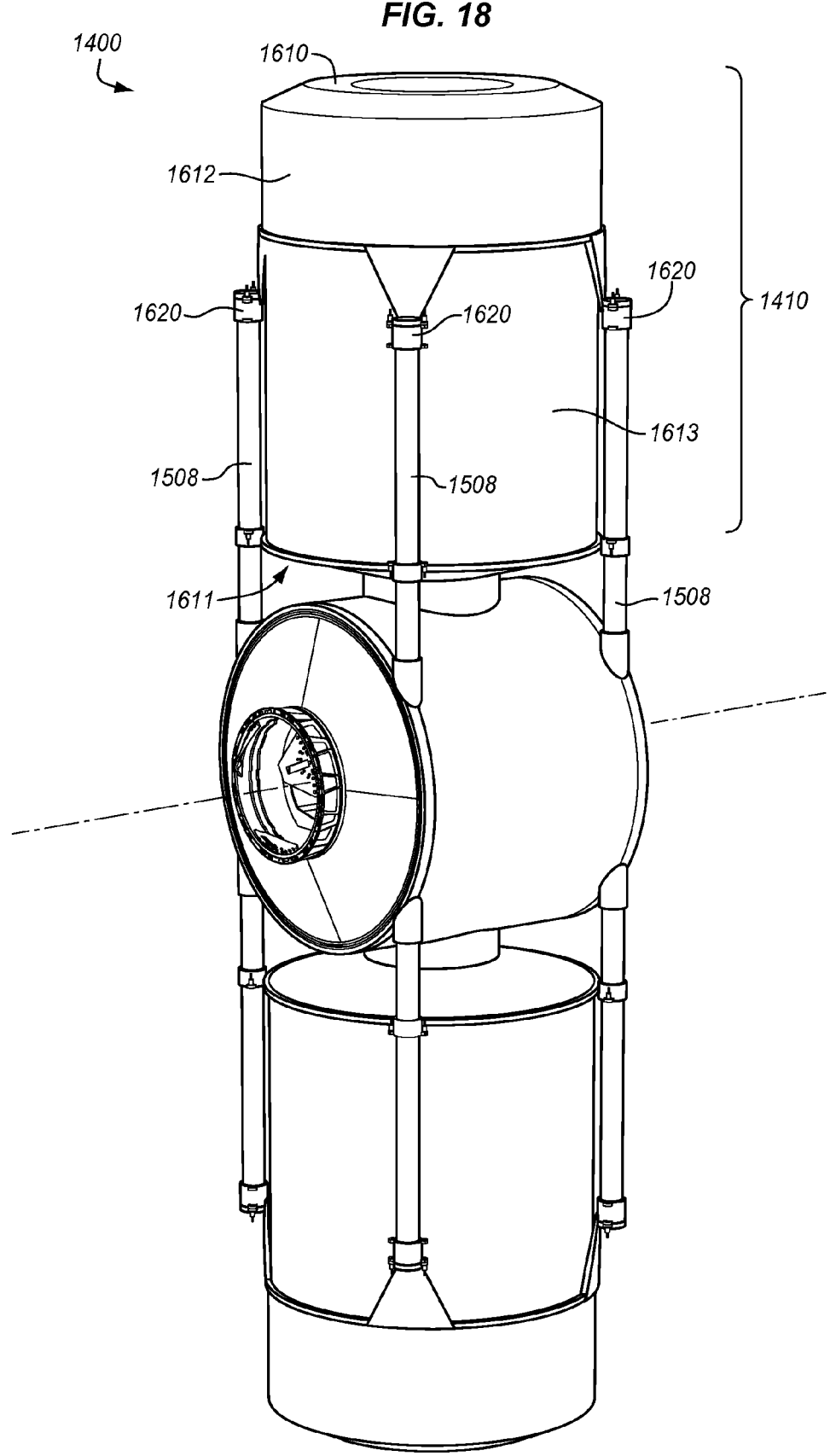
FIG. 18 illustrates a habitation module with extendable gravity chambers in an extended position in an exemplary embodiment.

After HAB 1400 is transported to space, guide connectors 1620 are released from locking collars 1702. At this time, extendable gravity chamber 1410 may be converted from the contracted position to an extended position. FIG. 18 illustrates HAB 1400 in an extended position in an exemplary embodiment. Outer wall 1610 and cylindrical side wall 1612 may be raised along guide members 1508, which expands expandable side wall 1613. Extendable gravity chamber 1410 may be extended and raised by pressure (inflation), by a mechanical device, etc. Extension of gravity chamber 1410 increases the rotational radius of gravity chamber 1410. For example, extendable gravity chamber 1410 may be extended to have a rotational radius of about 6 meters.

Figure 19:
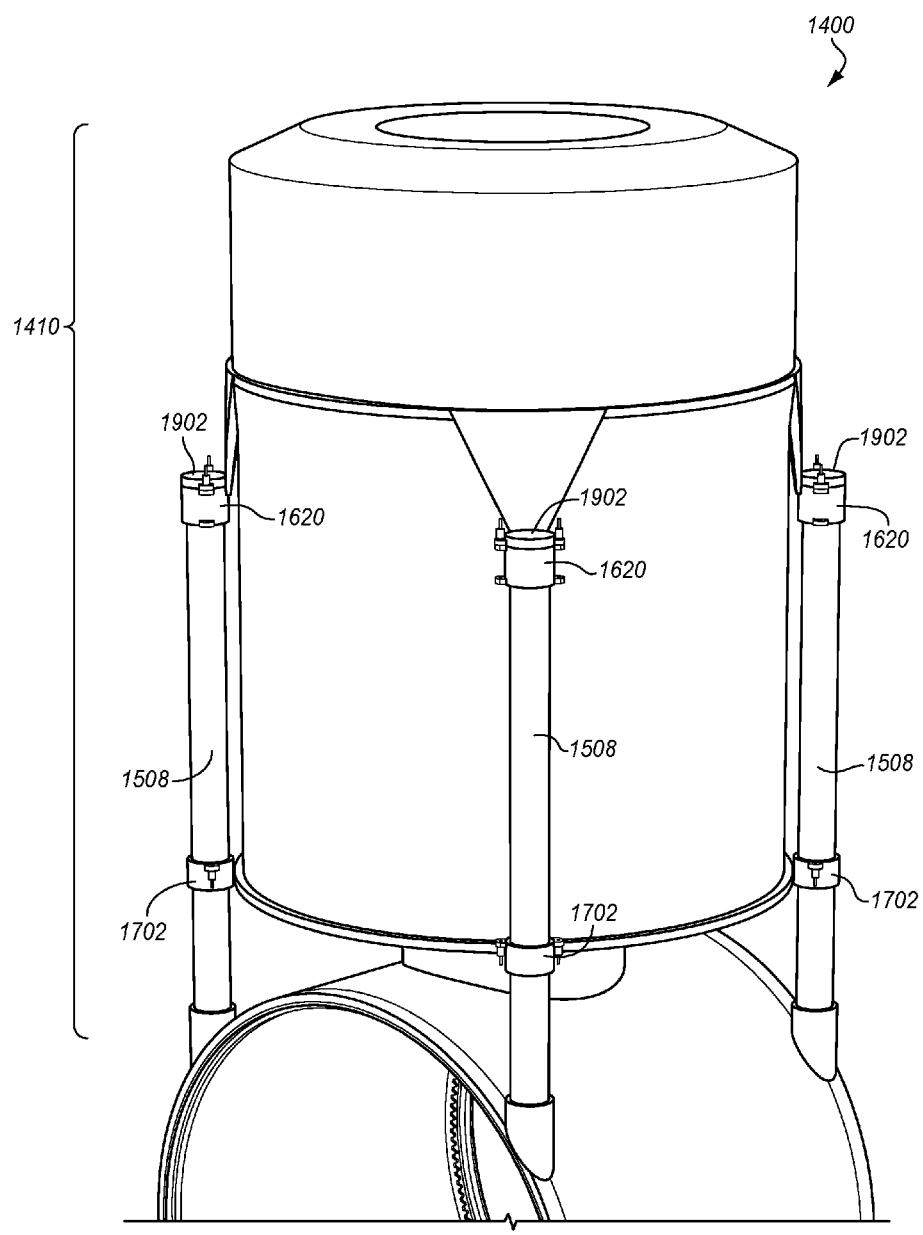
FIG. 19 is a magnified view of an extendable gravity chamber in an extended position in an exemplary embodiment.

FIG. 19 is a magnified view of extendable gravity chamber 1410 in an extended position in an exemplary embodiment. When in this position, guide connectors 1620 are slid up guide members 1508 so that extendable gravity chamber 1410 is extended in a desired fashion. To secure extendable gravity chamber 1410 in an extended position, end collars 1902 are affixed to guide members 1508 proximate to the distal end of guide members 1508 (i.e., the end situated away from the point of attachment of guide members 1508 to cylindrical hub 1412). Guide connectors 1620 are then affixed (e.g., bolted) to end collars 1902 to secure extendable gravity chamber 1410 in the extended position.

Figure 20:
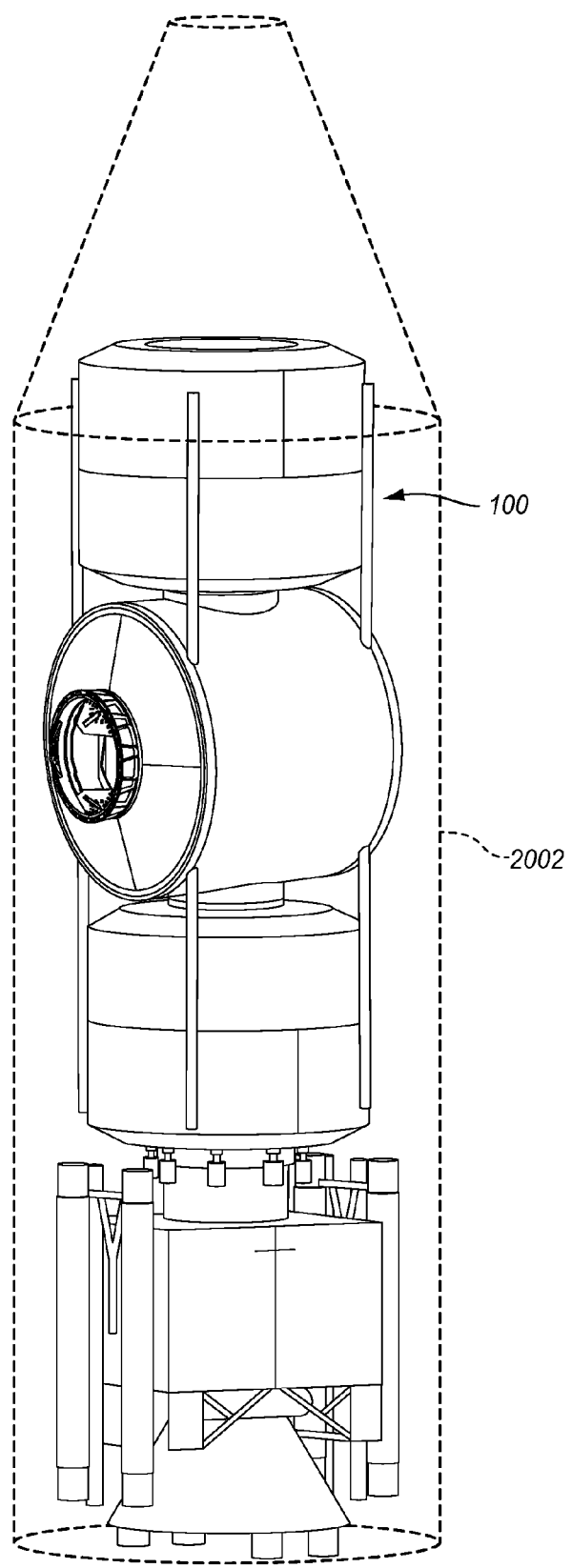
FIGS. 20-21 illustrate habitation modules loaded into launch vehicles in an exemplary embodiment.
Figure 21:
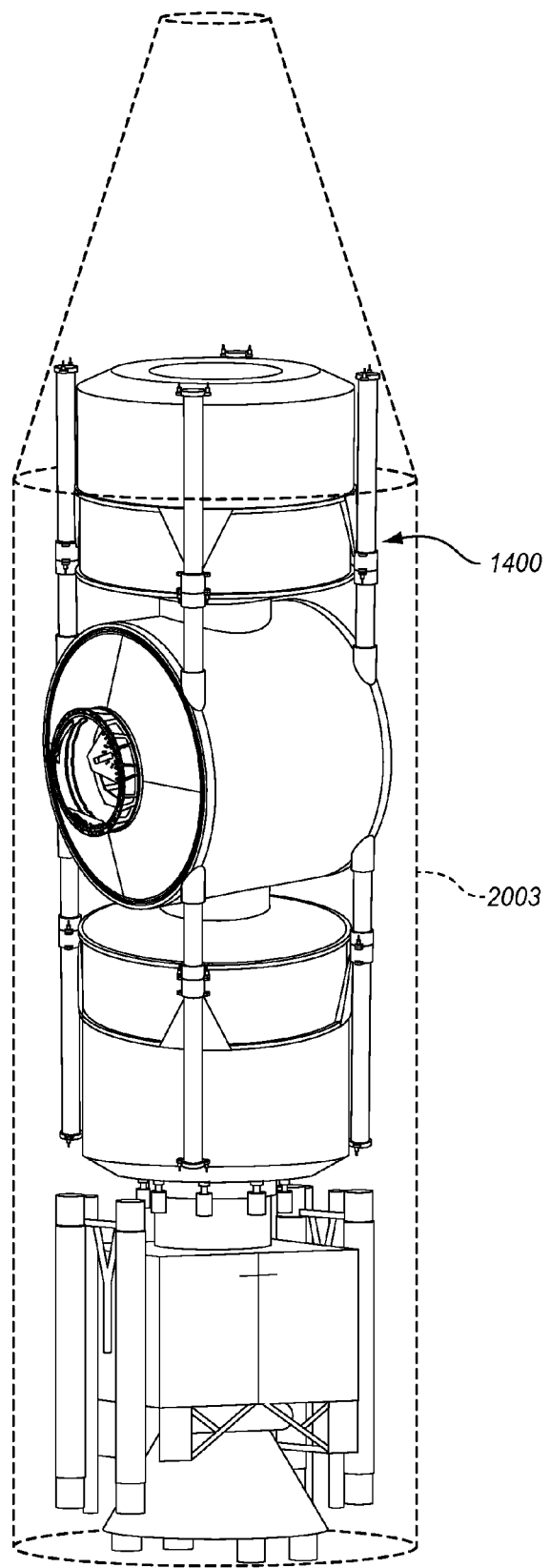

HABs 100 and 1400 are each one-piece units that may be assembled on Earth and transported into space as a complete unit. Traditional HABs are often times modular, and are transported into space in pieces and assembled at the space station. HABs 100 and 1400 are advantageous in that they do not need to assembled in space, and can be transported as a complete unit. FIGS. 20-21 illustrate HABs 100 and 1400 loaded into launch vehicles 2002-2003 in an exemplary embodiment. The launch vehicles 2002-2003 are Atlas rockets in this embodiment. Even though HABs 100 and 1400 are each one-piece units, they are able to fit in the cargo hold of launch vehicles 2002-2003 as complete units. The size of HABs 100 and 1400 may be constrained by the size of the cargo hold of launch vehicles 2002-2003. HAB 1400, in particular, is advantageous in that it is extendable, and can operate at a larger rotation radius when separated from launch vehicle 2003. Thus, the operational size of HAB 1400 is not constrained by the size of the cargo hold of launch vehicle 2003.

Although specific embodiments were described herein, the scope is not limited to those specific embodiments. Rather, the scope is defined by the following claims and any equivalents thereof.

The invention claimed is:

1. A habitation module comprising:
a stationary structure that includes:
a first circular side wall;
a second circular side wall spaced apart from the first circular side wall and aligned axially; and
at least one support beam that attaches the first circular side wall and the second circular side wall; and
a rotating structure that rotates about an axis in relation to the stationary structure, wherein the rotating structure includes:
a cylindrical hub comprising a hollow cylinder that slides onto the stationary structure, and connects to the first circular side wall and the second circular side wall through rotatable attachment members, wherein the cylindrical hub includes a plurality of portals spaced radially around a circumference of the cylindrical hub;
a plurality of gravity chambers that are permanently affixed to the cylindrical hub about the portals, and project radially from the axis;
a first radial seal that spans a first gap between the cylindrical hub and the first circular side wall to form an air-tight seal around a circumference of the first circular side wall; and
a second radial seal that spans a second gap between the cylindrical hub and the second circular side wall to form an air-tight seal around a circumference of the second circular side wall.

2. The habitation module of claim 1 further comprising:
a drive mechanism configured to rotate the rotating structure about the axis in relation to the stationary structure to simulate a gravitational force within the gravity chambers; and
a ring gear affixed to the cylindrical hub and having teeth that mesh with teeth on the drive mechanism.

3. The habitation module of claim 1 wherein:
the rotatable attachment members comprise a pair of support bearings;
a first one of the support bearings connects the cylindrical hub to the first circular side wall; and
a second one of the support bearings connects the cylindrical hub to the second circular side wall.

4. The habitation module of claim 1 wherein:
at least one of the gravity chambers comprises:
a hollow cylindrical enclosure that includes an outer wall, an inner wall, and a cylindrical side wall that connects the outer wall and the inner wall; and
a passage tube that projects from the inner wall of the hollow cylindrical enclosure;
wherein the passage tube is permanently affixed around one of the portals of the cylindrical hub.

5. The habitation module of claim 4 wherein:
an end of the passage tube is welded around one of the portals of the cylindrical hub.

6. The habitation module of claim 4 wherein the rotating structure further includes:
at least one support member having a first end affixed to the cylindrical hub, and a second end affixed to the cylindrical side wall of the at least one gravity chamber.

7. The habitation module of claim 1 wherein:
at least one of the gravity chambers is an extendable gravity chamber comprising:
a hollow cylindrical enclosure that includes an outer wall and an inner wall, and includes a cylindrical side wall and an expandable side wall that connect the outer wall and the inner wall; and
a passage tube that projects from the inner wall of the hollow cylindrical enclosure;
wherein the passage tube is permanently affixed around one of the portals of the cylindrical hub;
wherein the expandable side wall is sealed around a circumference of the cylindrical side wall and a circumference of the inner wall to form an airtight cavity within the extendable gravity chamber.

8. The habitation module of claim 7 wherein:
an end of the passage tube is welded around one of the portals of the cylindrical hub.

9. The habitation module of claim 7 wherein:
the rotating structure further includes guide members, wherein one end of each of the guide members is affixed to the cylindrical hub;
the extendable gravity chamber includes guide connectors attached to the cylindrical side wall that are slidably connected to the guide members; and
the guide connectors slide along the guide members when the extendable gravity chamber is extended.

10. The habitation module of claim 9 wherein:
the rotating structure further includes locking collars that are affixed to the guide members proximate to the one end of the guide members that is affixed to the cylindrical hub; and
the guide connectors attach to the locking collars to secure the extendable gravity chamber in a contracted position.

11. The habitation module of claim 9 wherein:
the rotating structure further includes end collars that are affixed to the guide members proximate to a distal end of the guide members; and
the guide connectors attach to the end collars to secure the extendable gravity chamber in an extended position.

12. The habitation module of claim 1 wherein:
the first circular side wall of the stationary structure includes a hatch; and
the stationary structure further includes a docking mechanism that encircles the hatch for attaching the stationary structure to a module of a space station.

13. The habitation module of claim 1 further comprising:
a counter-rotating member that rotates about the axis in an opposite direction than the rotating structure.

14. The habitation module of claim 13 wherein:
the first circular side wall of the stationary structure includes a hatch; and
the counter-rotating member includes:
a cylindrical counter-weight that encircles the hatch; and
a drive mechanism that rotates the cylindrical counter-weight about the axis in the opposite direction than the rotating structure.

15. The habitation module of claim 14 wherein:
the drive mechanism adjusts a rotational speed of the cylindrical counter-weight to compensate for a change in mass within the gravity chambers.

16. An apparatus comprising:
a habitation module for providing an artificial gravity environment in space, the habitation module comprising:
a stationary structure;
a rotating structure that slides over the stationary structure and attaches to the stationary structure using annular support bearings to rotate about an axis, wherein the rotating structure is a unitary body comprising:
   a cylindrical hub that comprises a hollow cylinder having a plurality of portals spaced radially around a circumference of the hub; and
   an opposing pair of gravity chambers that are permanently affixed about the portals of the hub, and project radially from the axis in opposite directions;
a pair of radial seals that form an air-tight seal between the rotating structure and the stationary structure; and
a drive mechanism that rotates the rotating structure about the axis in relation to the stationary structure to simulate a gravitational force within the gravity chambers.

17. The apparatus of claim 16 wherein:
the gravity chambers each comprise:
   a hollow cylindrical enclosure that includes an outer wall, an inner wall, and a cylindrical side wall that connects the outer wall and the inner wall; and
   a passage tube that projects from the inner wall of the hollow cylindrical enclosure;
   wherein an end of the passage tube is permanently affixed around one of the portals of the cylindrical hub.

18. The apparatus of claim 17 wherein:
the end of the passage tube is welded around one of the portals of the cylindrical hub.

19. The apparatus of claim 17 wherein:
the rotating structure further includes:
   support members that extend between the cylindrical hub and one of the gravity chambers;
   the support members each having a first end affixed to the cylindrical hub, and a second end affixed to the cylindrical side wall of the one of the gravity chambers.

20. An apparatus comprising:
a habitation module for providing an artificial gravity environment in space, the habitation module comprising:
   a stationary structure;
   a rotating structure that slides over the stationary structure and attaches to the stationary structure using annular support bearings to rotate about an axis, wherein the rotating structure is a unitary body comprising:
      a cylindrical hub that comprises a hollow cylinder having a plurality of portals spaced radially around a circumference of the hub; and
      an opposing pair of extendable gravity chambers that are permanently affixed around the portals of the hub, and project radially from the axis in opposite directions, wherein each of the extendable gravity chambers are configured to extend radially;
   a pair of radial seals that form an air-tight seal between the rotating structure and the stationary structure; and
   a drive mechanism that rotates the rotating structure about the axis in relation to the stationary structure to simulate a gravitational force within the gravity chambers.

21. The apparatus of claim 20 wherein:
the extendable gravity chambers each comprise:
   a hollow cylindrical enclosure that includes an outer wall and an inner wall, and includes a cylindrical side wall and an expandable side wall that connect the outer wall and the inner wall; and
   a passage tube that projects from the inner wall of the hollow cylindrical enclosure;
   wherein an end of the passage tube is permanently affixed around one of the portals of the cylindrical hub;
   wherein the expandable side wall is sealed around a circumference of the cylindrical side wall and a circumference of the inner wall to form an airtight cavity within the extendable gravity chamber.

22. The apparatus of claim 21 wherein:
the end of the passage tube is welded around one of the portals of the cylindrical hub.

23. The apparatus of claim 21 wherein:
the rotating structure further includes guide members, wherein one end of each of the guide members is affixed to the cylindrical hub;
the extendable gravity chambers each includes guide connectors attached to the cylindrical side wall that are slidably connected to the guide members; and
the guide connectors slide along the guide members when the extendable gravity chambers are extended.

24. The apparatus of claim 23 wherein:
the rotating structure further includes locking collars that are affixed to the guide members proximate to the one end of the guide members that is affixed to the cylindrical hub; and
the guide connectors attach to the locking collars to secure the extendable gravity chambers in a contracted position.

25. The apparatus of claim 23 wherein:
the rotating structure further includes end collars that are affixed to the guide members proximate to a distal end of the guide members; and
the guide connectors attach to the end collars to secure the extendable gravity chambers in an extended position.

* * * * *